United States Patent [19]

Beachem et al.

[11] 4,095,050

[45] June 13, 1978

[54] MONITOR AND CONTROL SYSTEM

[75] Inventors: Ronald Beachem, Mound; Dennis Covington, Minneapolis, both of Minn.

[73] Assignee: Leon O. Shaw, Minneapolis, Minn.

[21] Appl. No.: 678,237

[22] Filed: Apr. 19, 1976

[51] Int. Cl.² .......................................... H04M 11/00
[52] U.S. Cl. ................................. 179/2 A; 179/1 MN
[58] Field of Search .................. 179/2 R, 2 A, 2 AM, 179/1 MN; 340/151, 163

[56] References Cited

U.S. PATENT DOCUMENTS

| | | | |
|---|---|---|---|
| 3,647,971 | 3/1972 | Cushman | 179/2 A |
| 4,016,360 | 4/1977 | Cane | 179/1 MN |

Primary Examiner—William C. Cooper
Assistant Examiner—Joseph A. Popek
Attorney, Agent, or Firm—Dorsey, Windhorst, Hannaford, Whitney & Halladay

[57] ABSTRACT

A device for monitoring and controlling equipment, such as an agricultural irrigation system. The device can be called by an ordinary telephone from anywhere in the world and after answering the telephone the device will monitor and indicate to the caller the system status, that is, whether the system and certain system parameters are operating. If the caller is calling on a conventional Touch-Tone* telephone the caller can then access the system with a confidential three digit access code. (*Touch-Tone is a registered Trademark of the American Telephone and Telegraph Company.) If the system recognizes and verifies the access code the calling operator, with the use of two digit commands, can start and stop system components as well as monitor those and other components to assure that the controlled system is operating properly. The device also includes automatic "hang-up" so that if the command to hang-up the telephone after the system has been monitored and controlled is not operable the device itself will assure that the telephone is disconnected.

29 Claims, 18 Drawing Figures

Fig. 4

| Fig.4a | Fig.4b |
|---|---|

Fig. 5

| Fig.5a | Fig.5b |
|---|---|
| Fig.5c | Fig.5d |
| Fig.5e | Fig.5f |
| Fig.5g | Fig.5h |
| Fig.5i | Fig.5k |
| Fig.5j | |

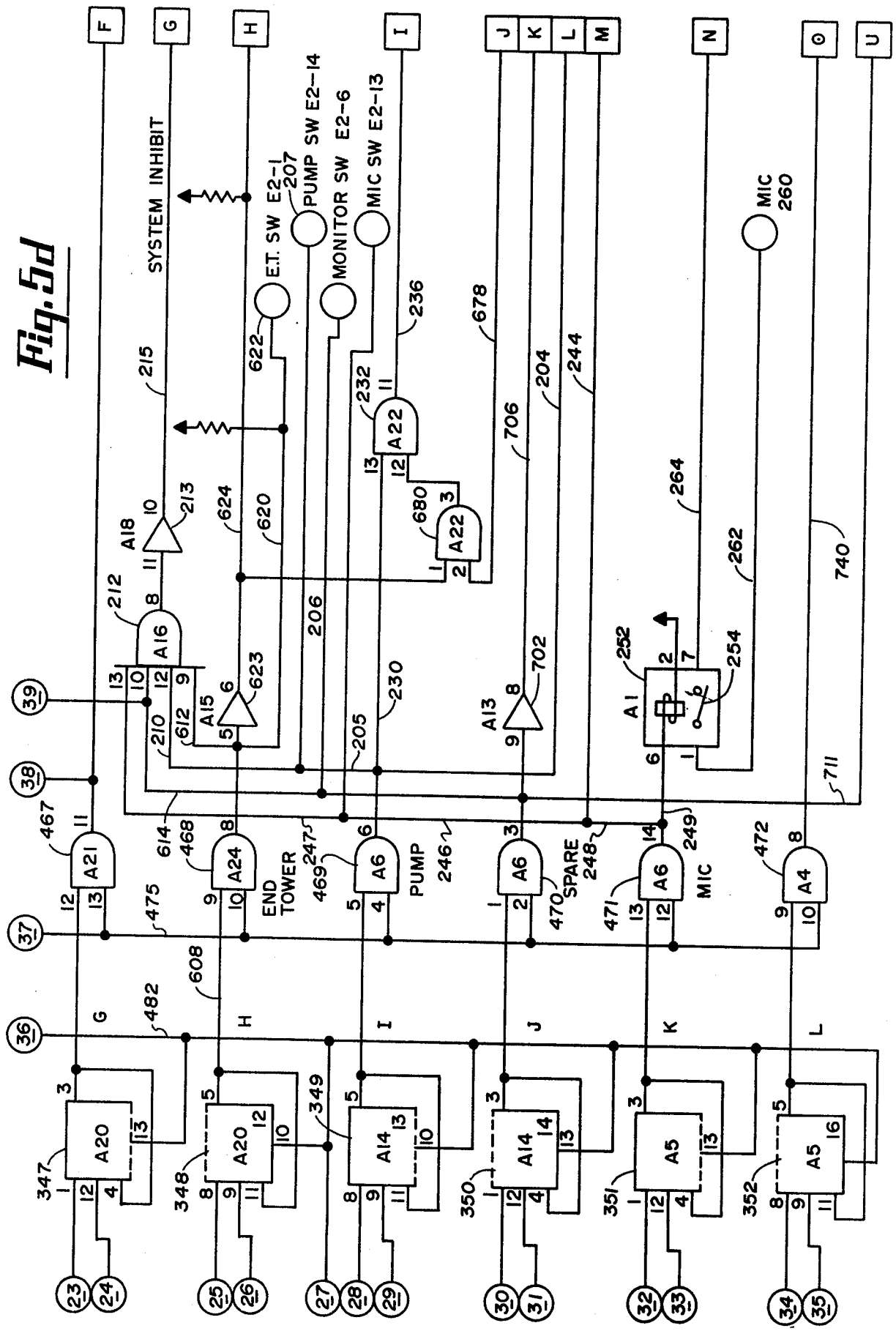

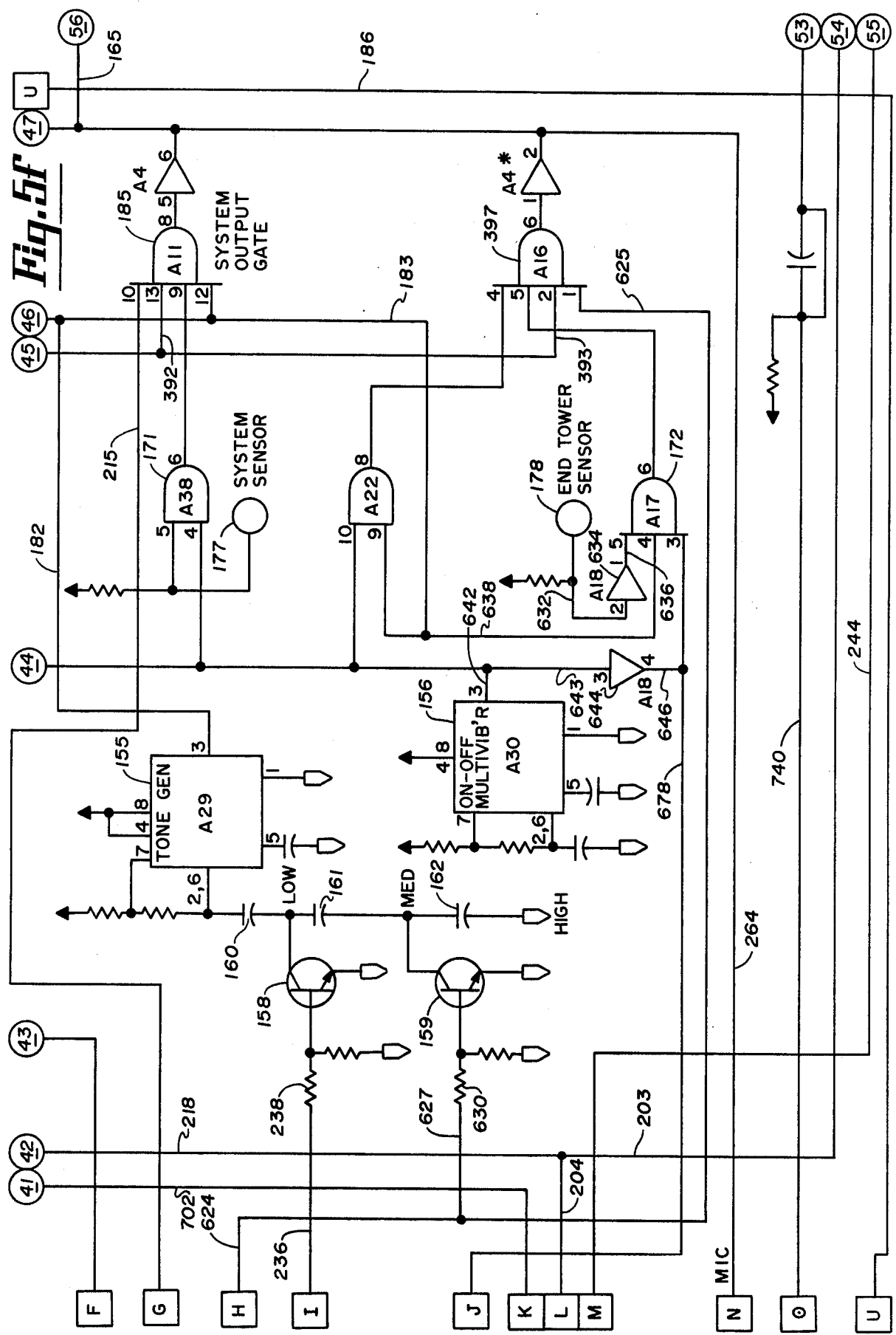

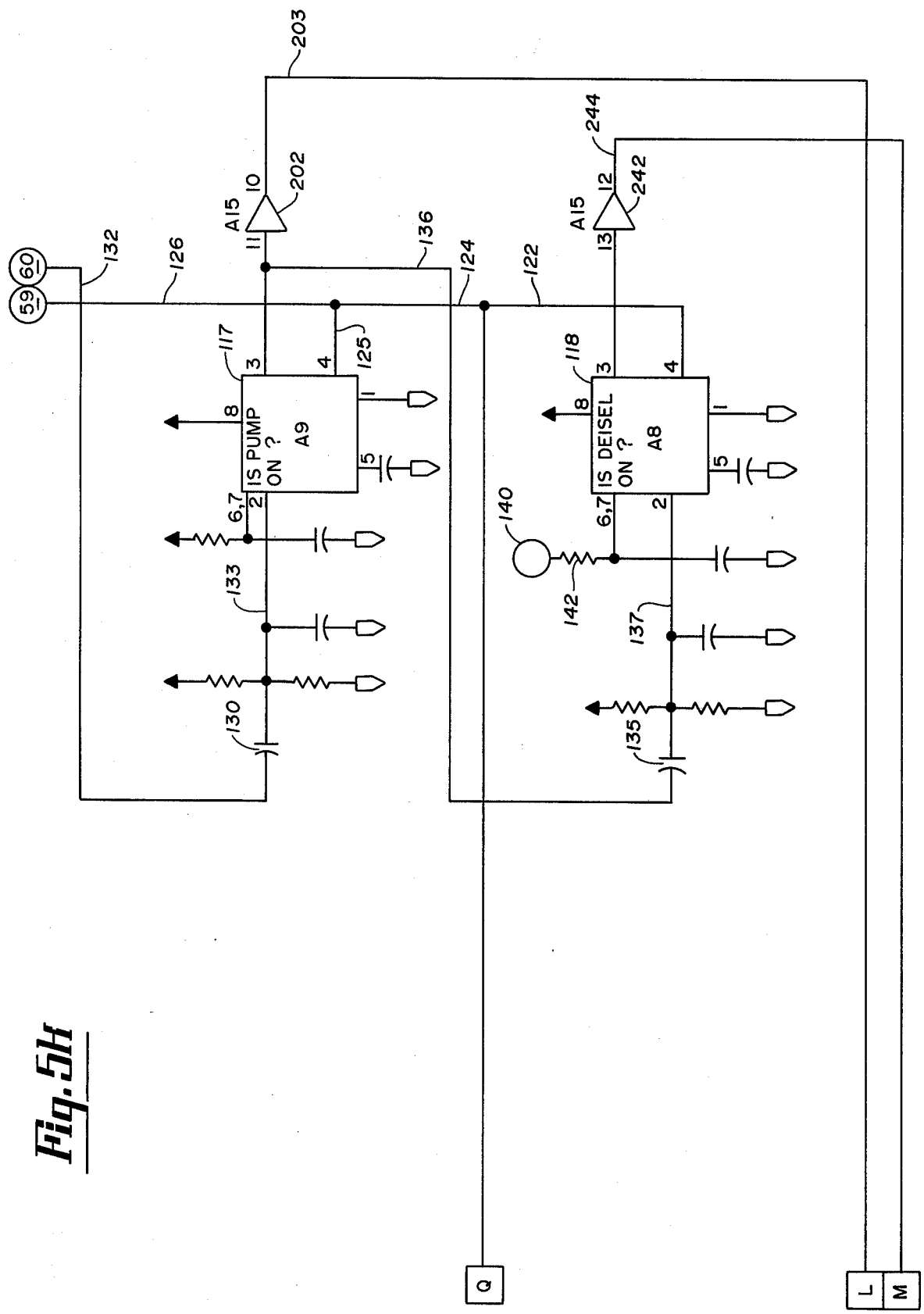

4,095,050

MONITOR AND CONTROL SYSTEM

BACKGROUND OF THE INVENTION

This invention is concerned with a device which is particularly well suited for use in a farm environment. Large corporate farms are becoming increasingly more prevalent. Also, many farmers are presently acquiring land which is not contiguous to or in the vicinity of their homestead. To assure maximum production yields the modern-day farmer cannot depend on the vagaries of the weather and must exercise some control over the growing conditions affecting his crops. One of the most commonplace controls is that of irrigation.

A well is drilled and an irrigator, which may be energized by a diesel engine supplying electrical power, rotates around the farmer's field to irrigate the crops. While irrigation systems of the past have been automatically controlled by programmable computers, such as shown in U.S. Pat. No. 3,723,753 issued Mar. 27, 1973, they have required the farmer or someone he hires to drive to the field to check system status and to troubleshoot and operate the irrigation system when necessary or desired. Because of the environment, and the expense and complexity of remote control devices, it is not believed that there have been any attempts to remotely control irrigation systems or similar agriculturally oriented functions by telephone.

Patents have issued on telephone controls and other remote controlled appliances. However, telephone remote control devices in the past have taken essentially two forms, one of which is exemplified by patents such as U.S. Pat. No. 3,702,904 entitled "A Signal Counter" wherein the ringing signal of a telephone is utilized and a time consuming complex code of calls and ringing signals is utilized for control purposes. In that type of device there is no assurance that the control instructions have been executed.

Another very complicated form of telephone control is exemplified by U.S. Pat. No. 3,868,640 and No. 3,647,971. In this type of telephone control, such as U.S. Pat. No. 3,868,640, modulator/demodulators (modems) are utilized and complex computer grade commands originated with a digital computer are utilized to read or monitor items such as consumer meters registering the use of utility items such as electricity, gas, water, oil and the like. Similarly, in U.S. Pat. No. 3,647,971 encoding and decoding means transmit and receive as many as 256 tone combinations requiring complex indicating equipment to interpret the transmissions.

SUMMARY OF THE INVENTION

The present invention is a device compatible with dual tone multiple frequency signaling telephones which are used for everyday communications and are known as Touch-Tone telephones, Touch-Tone being a trademark of the American Telephone and Telegraph Company. It is a unique combination of components which results in an extremely functional apparatus with a minimum of components which is well suited for the environment in which it is to be used. The lack of complexity of the device particularly in relation to the user who may simply, by listening to and operating his telephone, control and monitor the controlled equipment, appears to be a distinct improvement over the trend of the prior art which, as pointed out above, appears to be becoming increasingly complex.

The device permits the telephone caller to monitor any number of system parameters to determine whether or not the system is operating properly. After monitoring the status of the system parameters, the caller can then access the device with his Touch-Tone telephone by sequentially depressing a confidential three digit access code. After the caller has accessed the device and the device has recognized the access code, the caller may then issue two digit control commands with his telephone to start or stop system components or to monitor further the operating status of system components. Monitoring is accomplished with the utilization of tone generators integrated into the device which emit various pitches of sound and sound patterns which are easily distinguished by the caller and which can fully inform the caller of the operating status of each of the system components.

After the caller has assured himself that the system is operating in the manner in which he desires, he may then command the device to hang-up the telephone. In the event of a malfunction in the hang-up command the device also includes an automatic hang-up.

Thus, if used on agricultural equipment or on any other equipment which is located at a place remote from the user, the user may monitor and control each and every piece of equipment in as many ways as he desires without ever leaving the vicinity of his telephone.

Various other objects of the invention will be apparent from a consideration of the accompanying specification, claims and drawing.

BRIEF DESCRIPTION OF THE DRAWINGS

FIG. 5, comprising FIGS. 5a through 5k, is a schematic diagram of the control logic which responds to the decoded signals to enable the user of the device to monitor and control system components.

DESCRIPTION OF THE PREFERRED EMBODIMENT

Figure 1:
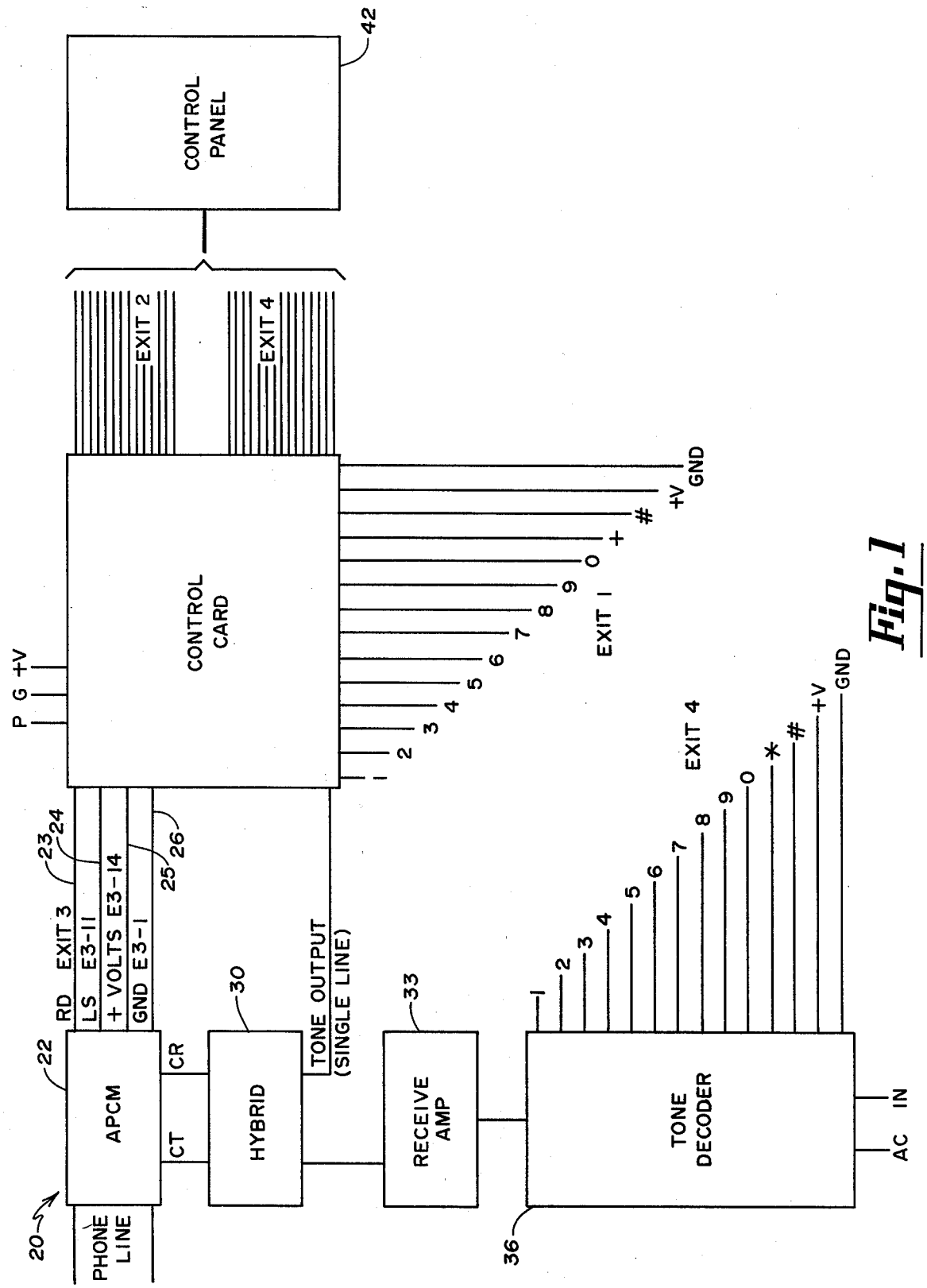
FIG. 1 is a schematic diagram showing the interrelationship of the functions of the device as well as the interrelationship of the figures of the drawing.

FIG. 1 is a schematic flow diagram showing the interrelationship of the various functions of the device. A telephone line 20 is provided connected to a standard Authorized Protective Connecting Module (APCM) 22. The APCM 22 is obtainable from any American Telephone and Telegraph approved manufacturer and when an incoming signal accesses the telephone number connected to the APCM 22 it produces an RD signal on an output line 23. Thereafter if a "line seize" signal is transmitted to the APCM 22, along line 24, and power 25 and ground 26 are connected, the APCM 22 assures that the telephone line remains connected to the device until the line seize signal is removed. Generation of the line seize signal from the RD ring signal is discussed in greater detail in connection with FIG. 5 below.

Figure 2:
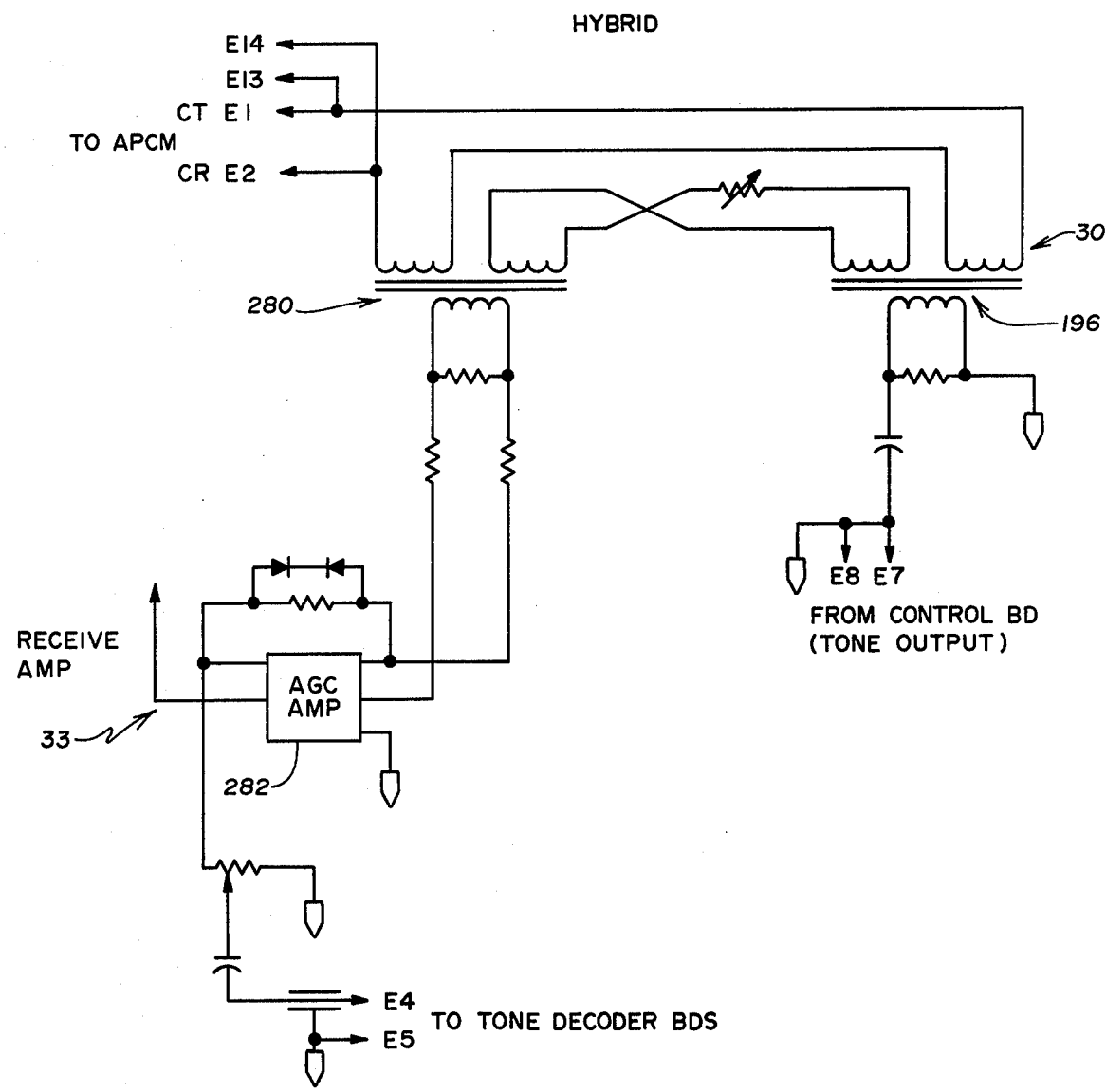
FIG. 2 is a schematic diagram of the telephone hybrid associated with the system, through which the input tones are communicated to the control logic and through which the system status tones, which perform the monitoring function, are transmitted back to the telephone caller. Also shown in FIG. 2 is a microphone preamp module connectable to a microphone which can be utilized to actually listen to the mechanical operation of the system or the system environment.
Figure 4A:
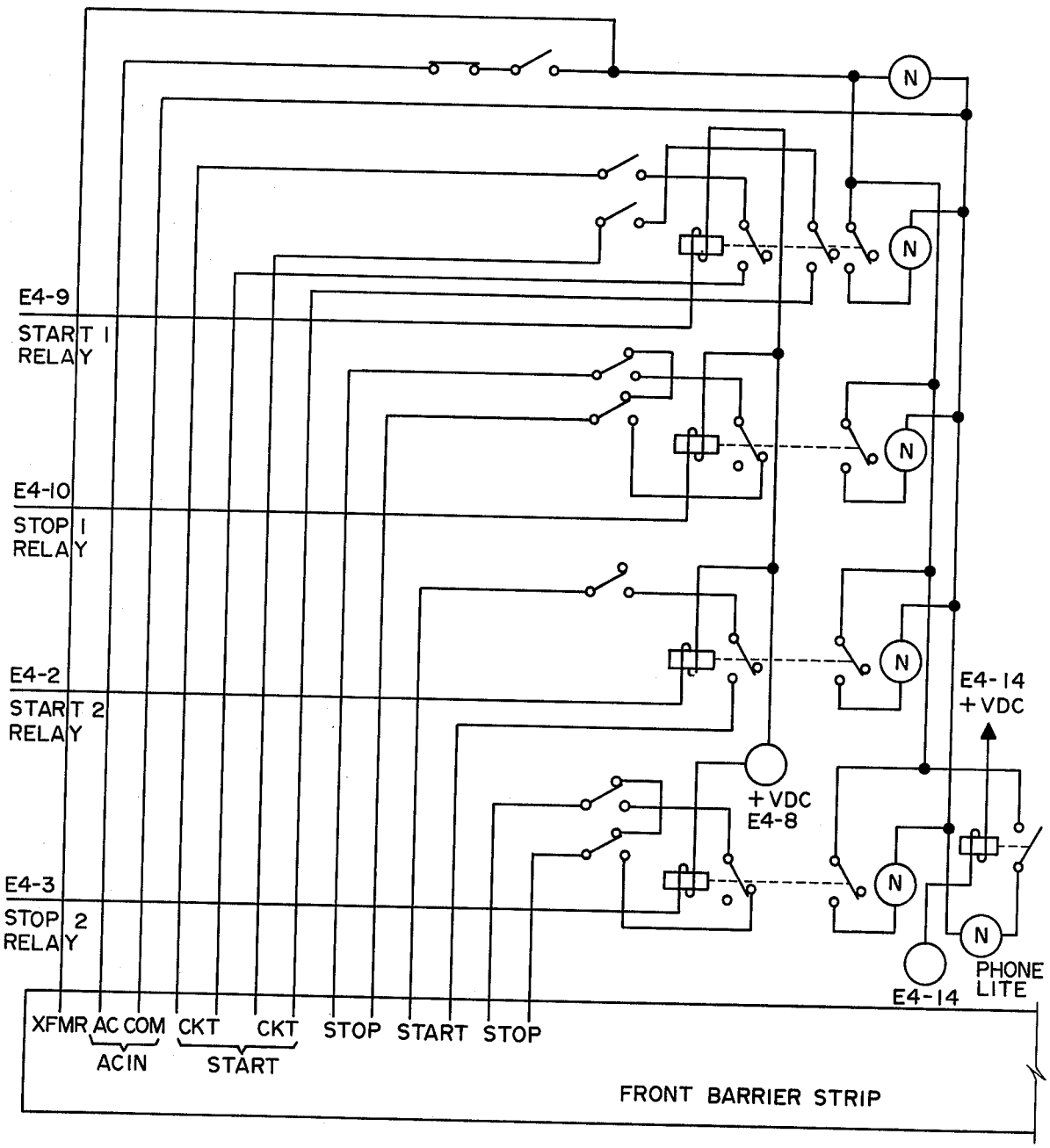
FIG. 4, consisting of FIGS. 4a and 4b, is a schematic diagram of a control board which can be utilized with the invention to operate the invention from the equipment itself.
Figure 4B:
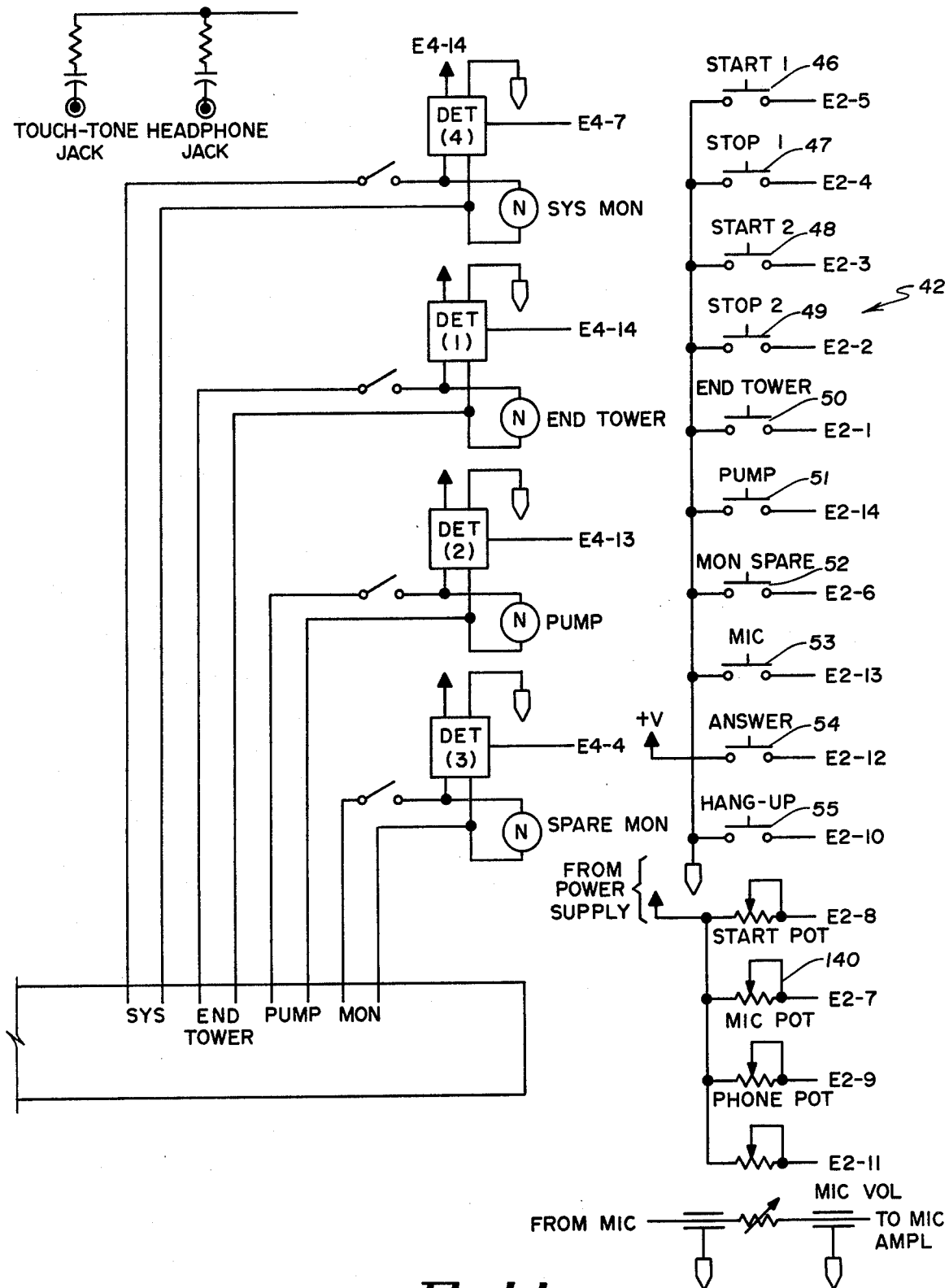

The APCM 22 is also connected to a telephone hybrid 30, shown in FIG. 2. The hybrid 30 is connected through a receive amplifier 33 to a tone decoder 36 which is designed to recognize each of the seven frequencies which make up the twelve tone combinations produced by conventional dual tone multiple frequency (DTMF) telephones which are more commonly known as Touch-Tone telephones. After the incoming signals are decoded, binary logic signals corresponding to the tone combinations are connected to the logic control portion of the system shown in greater detail in FIG. 5. Also, a control panel 42, shown in greater detail in FIG. 4, can be connected to the control logic of FIG. 5 to operate the device either with a telephone or with manual controls 46 – 55 shown in FIG. 4.

Initially, the user will call the number which has been connected to the APCM 22. When the number is called the RD signal 23 from the APCM 22 goes low. This signal is connected to the base of a transistor 62, shown in FIG. 5h, and when the signal goes low, the transistor 62 is turned on. The transistor 62 is connected to a relay 66 having a switch 68 which is connected to a supply voltage. When the normally open relay switch 68 is closed, the voltage is connected along line 70 through resistors 72, 76 to energize a transistor 82, designated the "answering transistor."

When the transistor 62 is energized and relay switch 68 closes it also causes a low signal on one side of a "line seize" relay 88 due to a diode 92 and a high signal through switch 68 line 94 and line 96 to the other side of the line seize relay 88. Consequently, the line seize relay 88 is energized and five volts is applied to the APCM 22.

When the relay 66 is energized closing the relay switch 68, five volts is also connected along line 70, resistor 98 and line 102 to the base of a transistor 106 which energizes the transistor 106. The transistor 106 is capacitor coupled with capacitor 108 to a one-shot 110 which can be set for any reasonable time to assure telephone hang-up at the end of the period of time. Time periods of between a minute and a half and five minutes have been found preferable for the "telephone answering" one-shot 110.

Figure 5A:
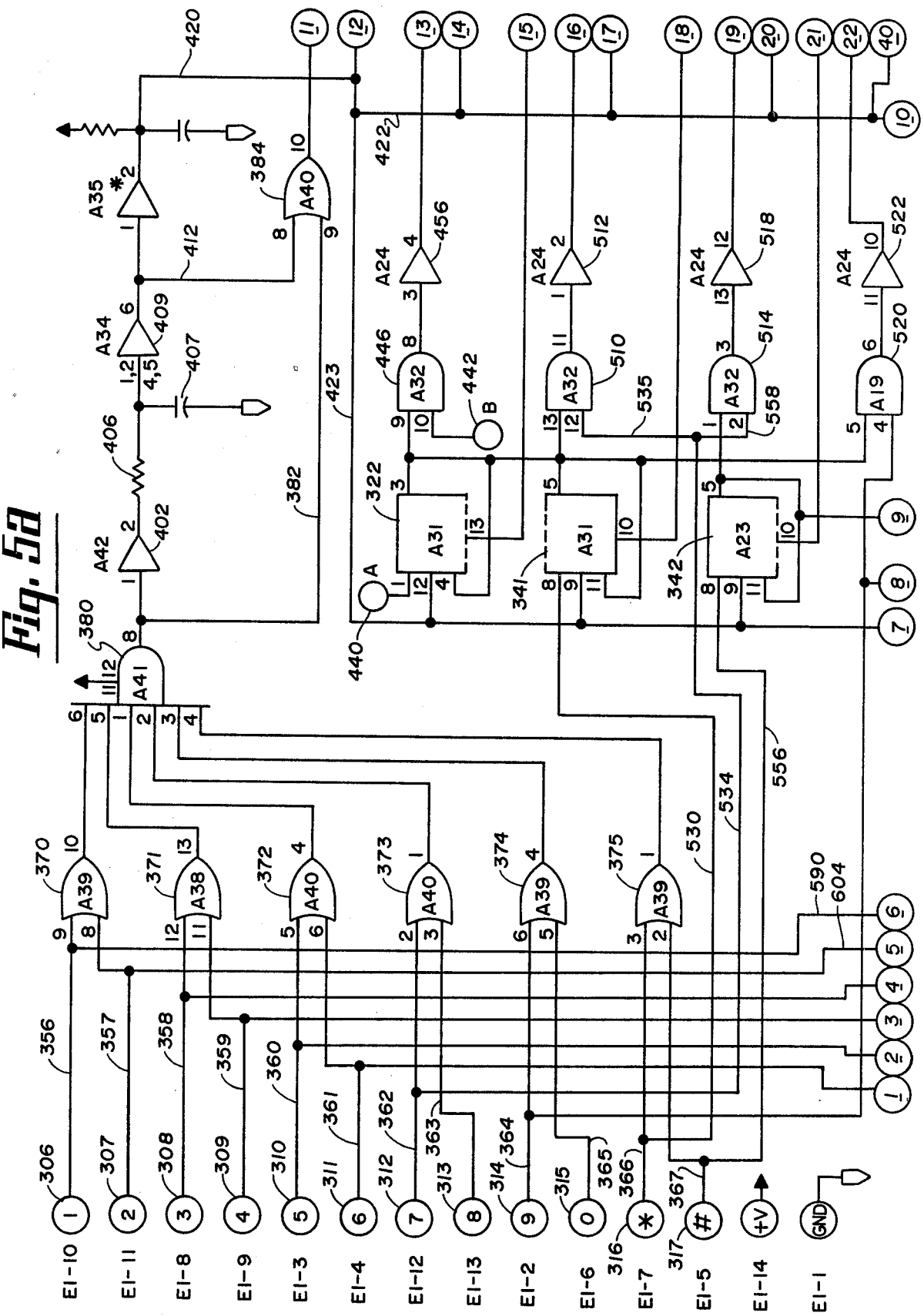
Figure 5B:
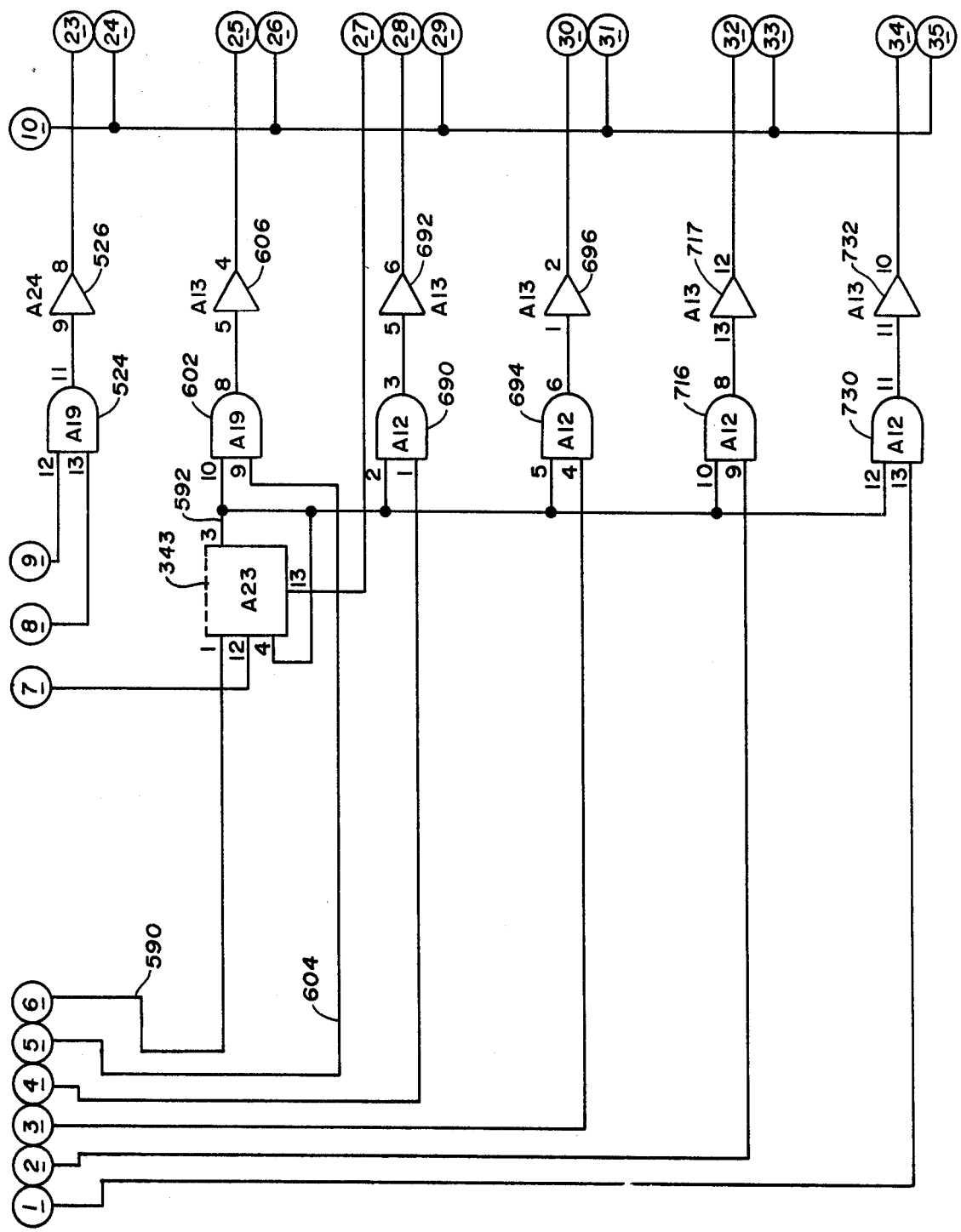
Figure 5C:
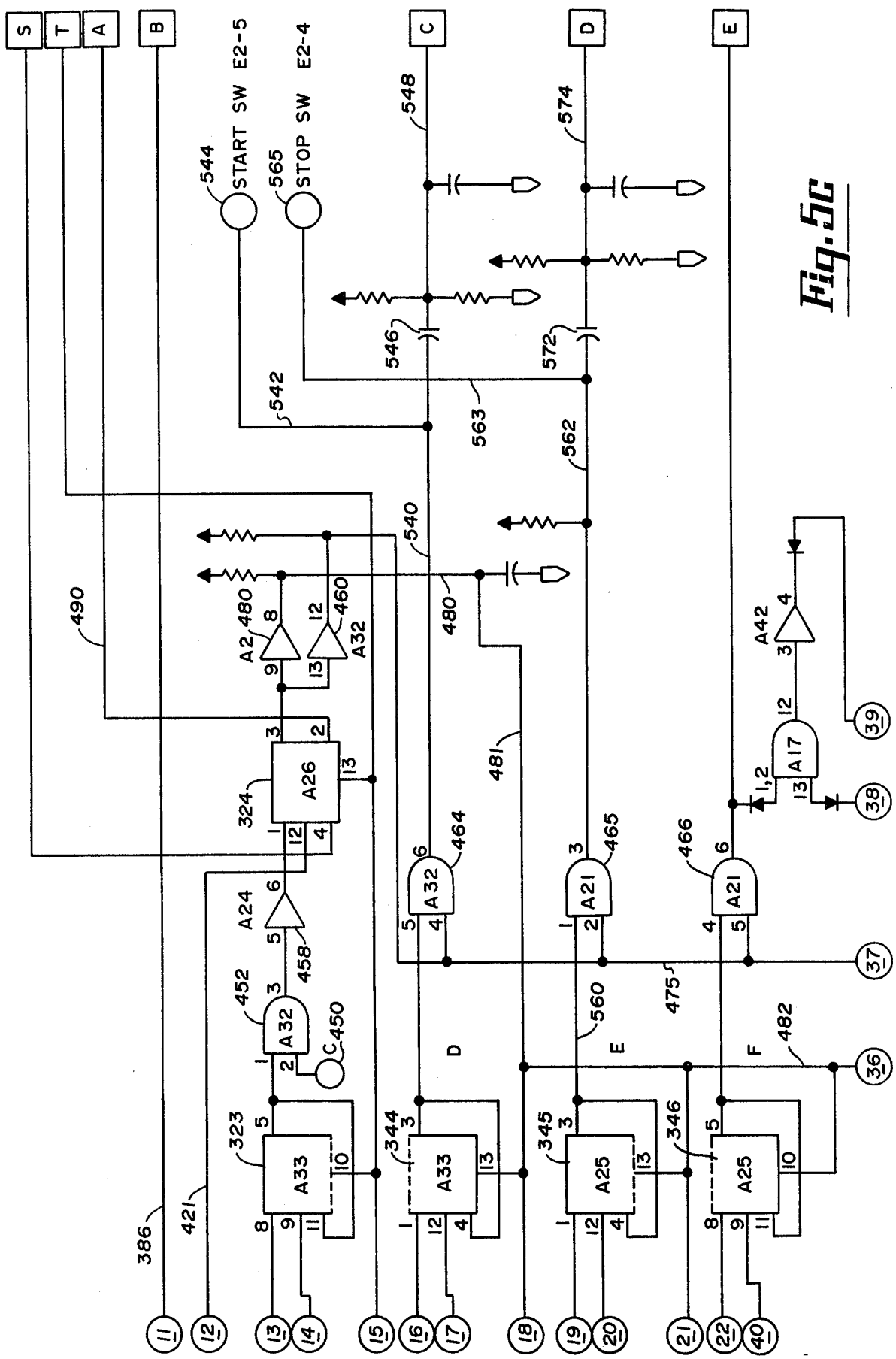
Figure 5E:
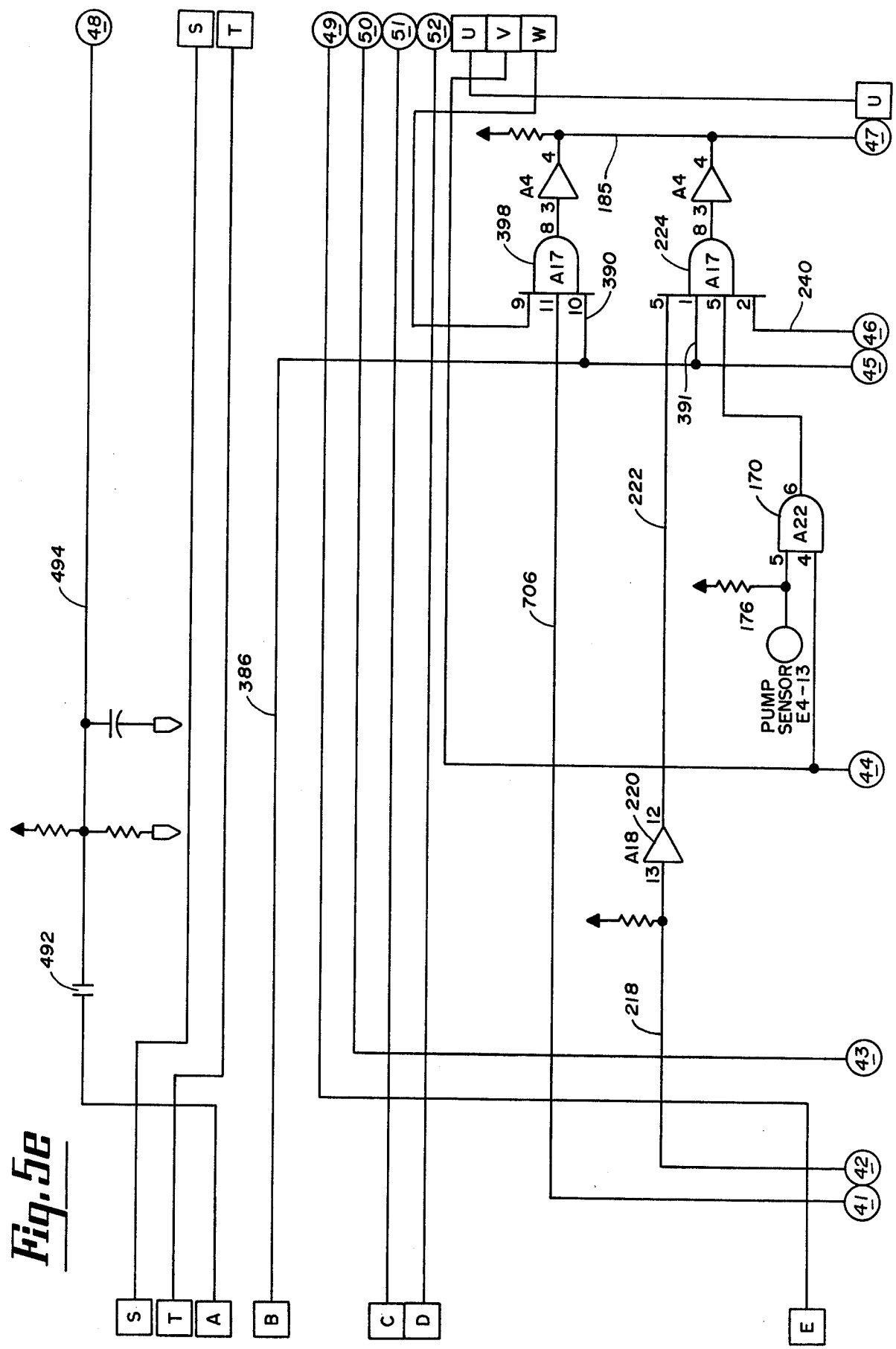
Figure 5G:
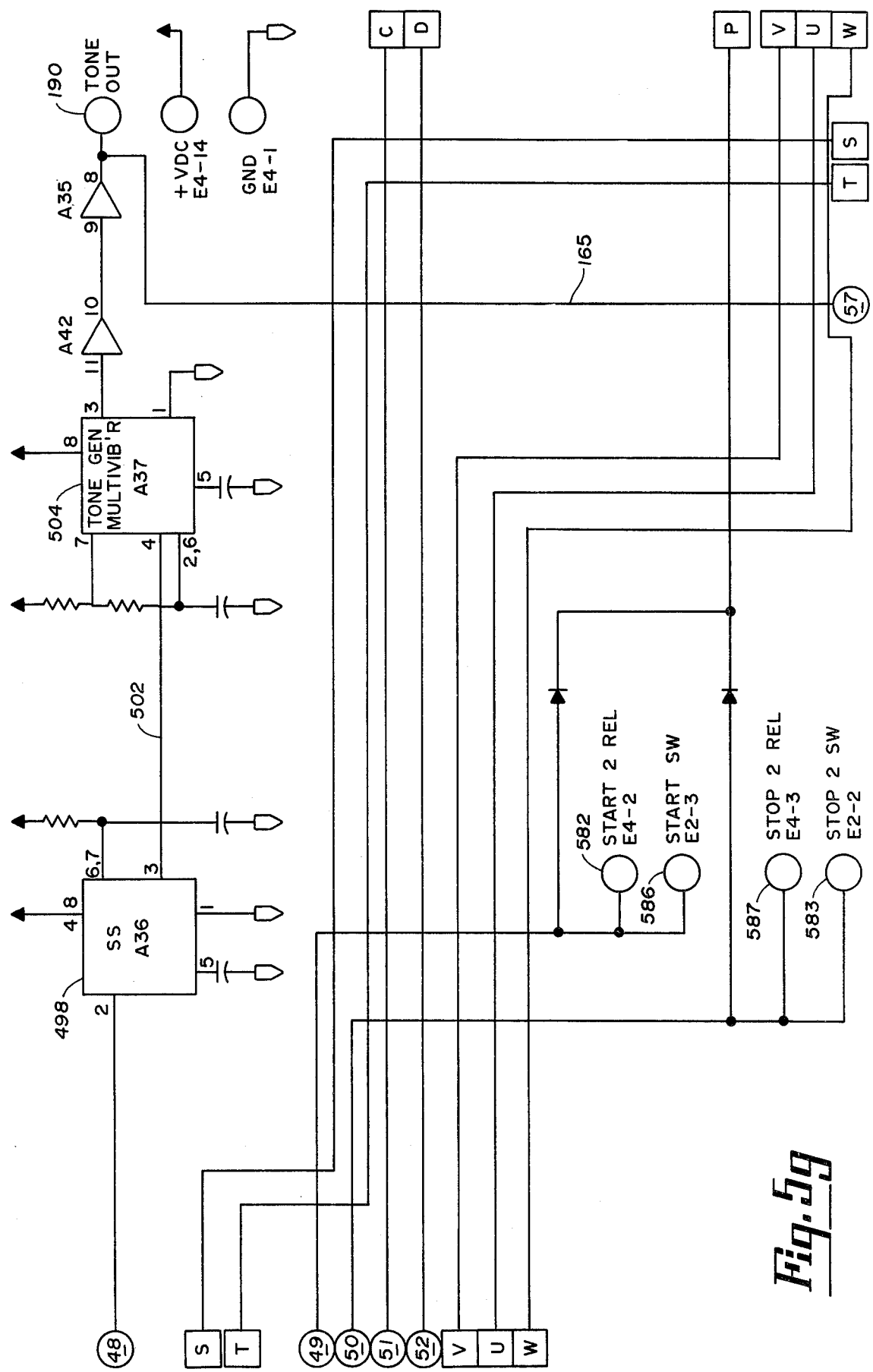
Figure 5H:
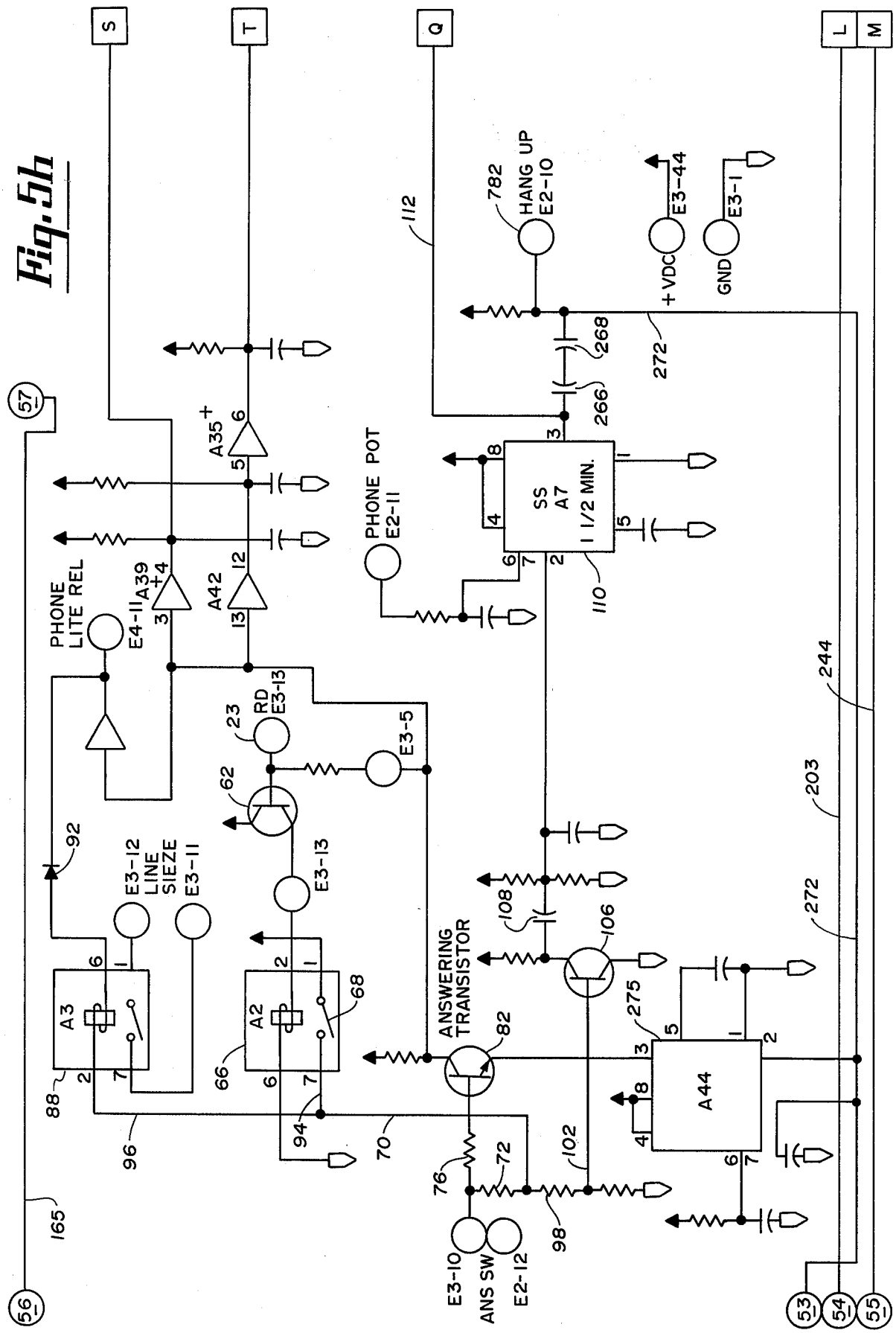
Figure 5I:
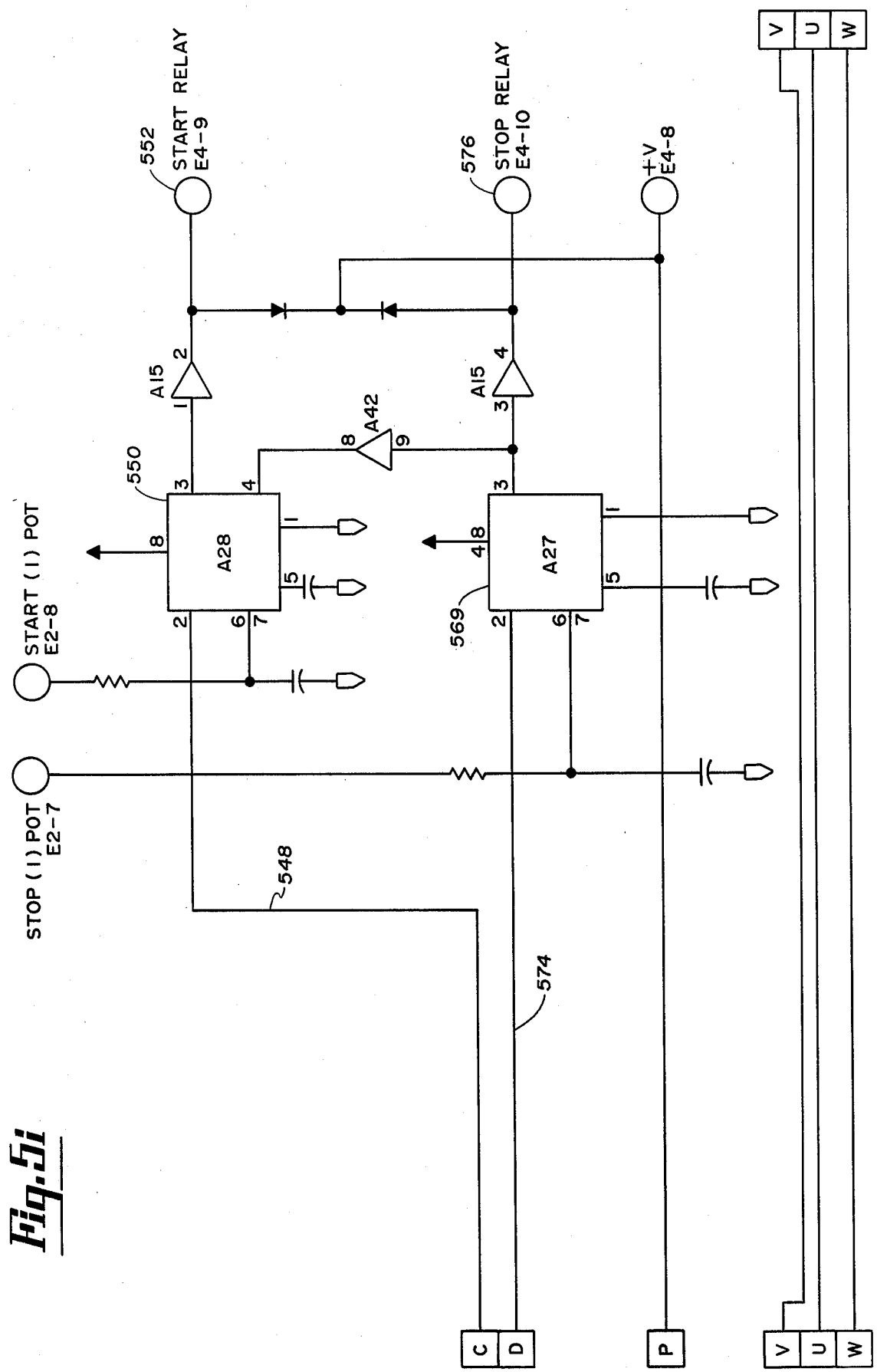
Figure 5J:
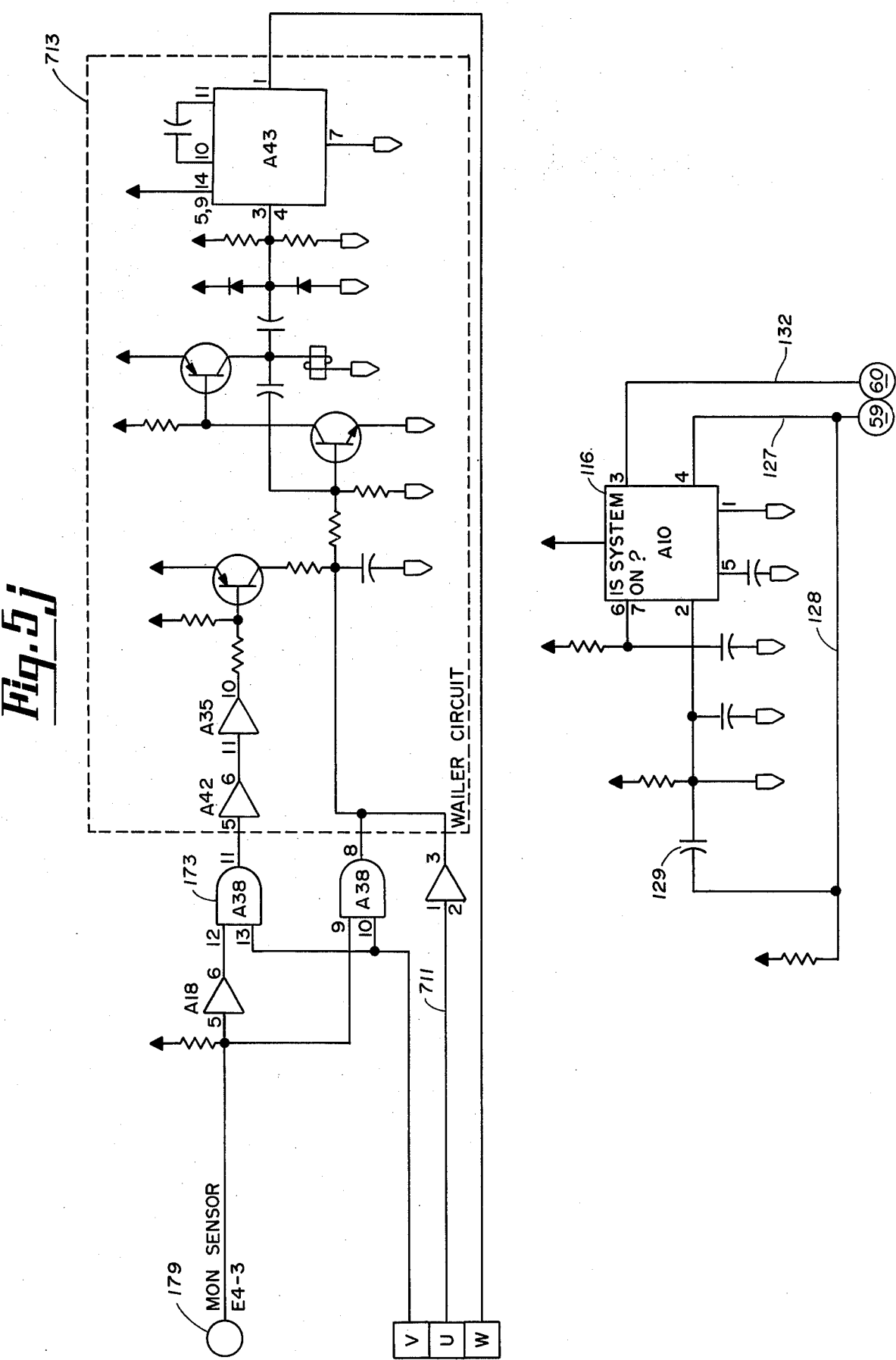

When the one-shot 110 fires it is connected along line 112 to three one-shots 116, 117 and 118, shown in FIGS. 5j and 5k each of which are inhibited, along lines 122, 124 and 125, and 126 and 127, respectively, until a signal is received from the one-shot 110. The signal is also capacitor coupled to the first one-shot 116 with capacitor 129 along lines 124, 126 and 128. Each one-shot is designed to have a set period of time to monitor system operation. Preferably the first one-shot 116 monitors system status. If used with an irrigation system the first one-shot 116 may provide a nine second listening time to determine whether or not the system is energized. With an irrigation system the second one-shot 117 can be utilized to determine whether or not a water pump is operating and the third one-shot 118 can be utilized with a microphone (not shown) to hear actual operation of one of the system environment, such as to confirm the operation of the diesel engine.

Each of the one-shots 116, 117 and 118 is set for a specified time of monitoring. The first one-shot may conveniently be set for a nine second interval. After it times out, the output is capacitor coupled with capacitor 130 along lines 132 and 133 to the second one-shot 117 which also is set for preferably an approximately nine second timing interval. The output of the second one-shot 117 is capacitor coupled with capacitor 135 along lines 136 and 137 to fire the third one-shot 118. The third one-shot 118, as shown in FIG. 5k, may be connected to a microphone (not shown) and the time duration of the one-shot 118 may be set by a pot 140 attached through a timing resistor 142 to input pins 6 and 7 of the one-shot 118.

As explained above, the monitoring function is accomplished through a series of tones. Preferably, the first one-shot 116 would verify system operation and, if the system is on and operating, a high tone of approximately nine seconds duration would be heard. If the system was not operating an intermittent high tone would be heard cycling at about one-half second. The tones which are transmitted to the user are generated with the use of a tone generator 155 and an on-off multivibrator 156 and two transistors 158, 159 connected in parallel across capacitors 160, 161, 162 which vary the tone output of the tone generator.

Referring now to FIG. 5f, a tone generator 155 is provided with three series connected capacitors 160 – 162 connected to the tone generator 155 at pins 2 and 6. Connected in parallel to two 161, 162 of the three capacitors 160 – 162 are transistors 158, 159 the first of which 158 will be short two 161, 162 of the three capacitors 160 – 162 to ground and the second of which 159 will short the last capacitor 162 to ground when energized. In this manner three distinct tones can be generated, a high tone, a medium tone and a low tone.

Also logically connected to the tone output line 165 is an on-off multivibrator 156. The on-off multivibrator 156 has preferably an oscillation cycle of approximately one-half second and is connected to enable and disable NOR gates 170 – 173, second inputs of which are controlled by system sensors 176 – 179.

In normal operation the device monitors the system status, that is whether the system is on or off, which is detected with the system sensor 177. Therefore, for the first nine seconds after the system one-shot 116 is fired, the system status will be monitored. The two transistors 158, 159 which are connected to the capacitors 160 – 162 which determine the pitch of the tone generated by the tone generator 155, will be off. Consequently, a high pitched tone will be produced by the tone generator 155 which is connected by line 182 and line 183 to the system status monitor output gate 185. If the system is operating, the system sensor 177 signal will disable NOR gate 171, thus the multivibrator 156 will have no effect on the tone produced and the continuous high pitched tone will be connected from the system output gate 185 along lines 186 and 165 to the tone output terminal 190 which, as shown in FIG. 2, is connected to the output hybrid 196. If the system is not operating, NOR gate 171 will be enabled by the system sensor 177 on input pin 5 and every half second by the oscillation of the on-off multivibrator 156. Consequently, the output of the NOR gate 171 which is also connected to input pin 9 of the system status monitor output gate 185 will cause an oscillating high pitched tone which will be on every half second and off every half second. Again, this intermittent tone will be transmitted to the hybrid 30 from the tone output terminal 190.

After the first nine seconds the system status one-shot 116 will time out. The output of the system status one-shot 116 on pin 3 is capacitor coupled with capacitor 130 along lines 132, 133 to the second monitor one-shot 117 which may be used to monitor another system component such as the pump for an irrigation system. The output signal is also connected through inverter 202 line 203, line 204 on FIGS. 5f and 5d, lines 205 and 206 on FIG. 5d to energize the pump monitor switch 207 and line 210 to the system status inhibit gate 212, the output of which is inverted with inverter 213 and connected along line 215 in FIGS. 5d and 5f to inhibit the system status output gate 185. Connection from line 203 in FIG. 5f is also made along line 218 and through inverter 220, line 222 to enable the monitor 2 status output gate 224 and finally, as shown in FIG. 5d, connection is made from line 204 along line 230 to pin 13 of NOR gate 232 which is connected along line 236 on FIG. 5d and resistor 238 on FIG. 5f to turn on transistor 158. Turning on transistor 158 shorts capacitors 161 and 162 to ground and the tone generator 155 then produces a low tone. The output of the tone generator 155 is connected directly to the monitor 2 status output gate 224 along lines 182 and 240 to input pin 2. As with the system status monitoring, the pump sensor 176 will disable NOR gate 170 and thus, if the parameter being monitored, such as the pump, is operating, the output at the tone output terminal 190 will be a low tone. If the pump is not operating the NOR gate 170 will be enabled every half second which will disable the monitor 2 status output gate 224 and the output tone will be an intermittent low tone every half second.

Referring again to FIG. 5k, after the second monitor one-shot 117 has timed out the output from pin 3 is capacitor coupled with capacitor 135 to the third monitor one-shot 118 along lines 136 and 137. The output of the third one-shot 118 is also connected from output pin 3 through inverter 242 along line 244, along line 244 in FIGS. 5h and 5f and in FIG. 5d along lines 244, 246 and 247 to the system status inhibit NOR gate 212 so that the system status tone is not produced. It is also connected along lines 248 and 249 from line 244 to a microphone relay 252 having a switch 254. When that relay 252 is energized normally open switch 254 closes and the microphone output 260 is connected along line 262, through switch 254 to line 264 which, as shown in FIGS. 5f, 5h and 5i is connected along lines 186 and 165 to the tone output terminal 190 which is connected to the hybrid 30. In this manner the user of the system can actually hear by microphone the system environment to monitor, for example, the operation of a diesel engine, if a diesel engine is used to generate electricity for the system. The time that the diesel engine will be listened to can be determined by a potentiometer 140 connected to terminal 140 which is connected to input pins 6 and 7 of the one-shot 118 to determine the time that it will monitor.

After the listening cycle the operator can hang-up the telephone and the device will automatically hang-up when the telephone answering one-shot 110, shown in FIG. 5h, times out, the output of which is capacitor coupled with capacitors 266, 268 along line 272 to a hang-up one-shot 275 which removes the ground from the answering transistor 82. However, the user, after listening to the system status, may wish to change the system status. This may be conveniently done by the user with his Touch-Tone telephone. If the user has a dial telephone rather than a Touch-Tone telephone, Portable Remote Data Entry Terminals are commercially available from interface technology, Inc which attach to the mouthpiece of a dial telephone and transmit the standard twelve dual tone multiple frequency signals associated with Touch-Tone telephones.

Figure 3:
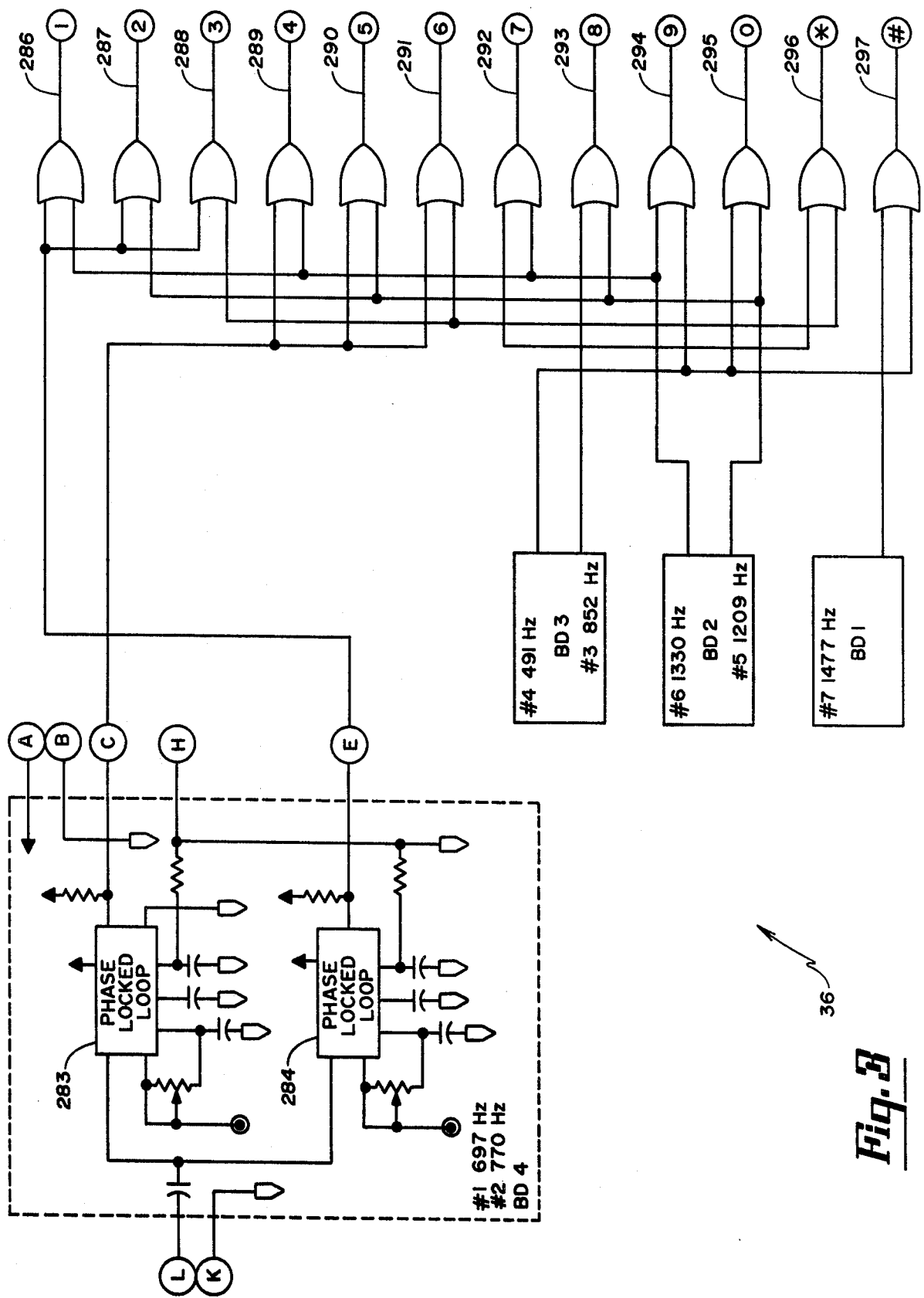
FIG. 3 is a schematic diagram showing decoders which are utilized to receive incoming dual tone, multiple frequency signals (Touch-Tone signals) and convert them into binary logic level signals.

As shown in FIG. 2, the receiving portion 280 of the hybrid 30 is connected through an automatic gain control amplifier 282 or receive amplifier to tone decoder boards 36 shown in FIG. 3. As shown in FIG. 3, the twelve input tones of a Touch-Tone telephone comprising the numerals zero through nine, a pound sign and an asterisk sign, are decoded with the use of phase locked loops (PLL's) 283, 284 on decoder boards 36 to produce twelve discrete binary logic signals, each corresponding to one of the Touch-Tone signals. The logic signals are connected along lines 286 – 297 respectively to input terminals 306 – 317 shown in FIG. 5a. If the user wants to access the system to control, start or stop certain system components, or if he wants to monitor selected system components, he may do so merely by touching the keys on his Touch-Tone telephone.

System control is achieved with the components shown primarily in FIGS. 5a through 5c. A three digit confidential access code sequentially sets three JK flip flops in series, 322, 323 and 324. If the correct code has been entered the system is accessed and control JK flip flops 341 – 352 are enabled. As shown in FIG. 5a, two system parameters may be started and stopped, four system parameters may be monitored, and the device can be "hung-up". In order to start a system component flip flop 341 must be energized. In order to stop a system component flip flop 342 must be enabled, and in order to monitor one of the system parameters or to hang-up the telephone, flip flop 343 must be enabled. Each of these initial flip flops 341 – 343 are enabled by the first digit of a two digit command. The second flip flop associated with each two digit command, which consists of flip flops 344 through 352, respectively, is enabled by the second digit to specifically identify the system component which is to be started, stopped or monitored or if the telephone is going to be hung-up. This control is achieved essentially in the following manner.

The initiation of any command by the touch of a Touch-Tone key will cause a high signal to appear on the corresponding input line 356 - 267, each of which are connected through NOR gates 370 - 375 to system control gate 380. A high output from system control gate 380 causes an immediate inhibit of the internal tones. This is accomplished along line 382 through NOR gate 384 along line 386 to line 386 on FIGS. 5c and 5f to lines 390 – 393, each of which inhibits one of the status monitor output gates 185, 224, 397, 398. Consequently, internal tones do not disrupt or affect the input tones which access or control the system.

Referring again to FIG. 5a, after the finger is removed from the Touch-Tone key and the corresponding line goes low into the system control gate 380, the internal tone will remain inhibited for approximately one hundred milliseconds because of the time delay circuit consisting of inverter 402, resistor 406, capacitor 407 and inverter 409, which is also connected to the input of NOR gate 384 along line 412. The time delayed signal is also connected along lines 420, 421, 422 and 423 to clock each of the flip flops 322 – 324 and 341 – 352. As indicated earlier, each of the flip flops are JK flip flops so the input to the flip flop will clock in on a low signal but the output will not change until the clock returns high again.

To gain access to the control flip flops 341 - 352, flip flops 322, 323 and 324 must be sequentially accessed with the correct three digit code in the correct order. The three digit code can be any three digits, each of which is hard wired to the access logic. The first number is hard wired to point A 440 which is connected to input pin 1 of flip flop 322. The second number is hard wired to point B 442, which is connected to input pin 10 of NOR gate 446 and the third number is hard wired to terminal C 450 which is connected to input pin 2 of NOR gate 452. Consequently, to access the device the Touch-Tone key corresponding to the first number is depressed. If it is the correct number, input pin 1 of flip flop 322 will be high. The depression of the number will also create a clock pulse as described above and when the clock goes high, the output will go high to input pin 9 of NOR gate 446. When the key corresponding to the second number is depressed, if it is the correct number, input pin 10 of NOR gate 442 will go high and NOR gate 446 will be fully enabled, the low output of which is inverted with inverter 456 to create a high input on pin 8 of flip flop 323. If the number is incorrect, NOR gate 446 will not be enabled and access will not be granted to the device. After the clock pulse, if the correct number was entered, the output of flip flop 323 will go high which will put a high signal on input pin 1 of NOR gate 452, then if the third signal is correct, hard wired to terminal C 450 to input pin 2 of NOR gate 452, NOR gate 452 will be fully enabled, the low output of which is inverted with inverter 458 and fed to input pin 1 of flip flop 342 to fully access the device. When the clock goes high the output from pin 3 of flip flop 324 goes through a buffer 460 and partially enables all of the command gates 464 through 472 along line 475. The output from pin 3 is also buffered 480 and connected to remove the inhibit from the command flip flops 341 - 352 along lines 480, 481 and 482.

Also, the output of pin 2 of flip flop 324 indicating that access has been gained is also capacitor coupled along line 490, capacitor 492 in FIG. 5e and line 494 to a one-shot 498 which is preferably set for five or six seconds. The output of the one-shot 498 is connected along line 502 to a tone generator 504, the output of which from pin 3 is connected to the output tone terminal 190. Since system status is always monitored when not inhibited and when other system parameters are not being monitored, the indication that the system has been accessed will usually be a staccato burst which is the best signal between the frequency of tone generator 504 and the high frequency tone indicative of an operating system status. When the one-shot 498 times out the caller/operator will again hear the system status as explained above.

The following commands are indicated in FIGS. 5a through 5d to command system operation. It should be understood, however, that any multiple digit command could be utilized in a similar manner. A "start one" command associated with flip flop 341, NOR gate 510, inverter 512, flip flop 344 and NOR gate 464 is "*-7". A "stop one" command associated with flip flop 342, NOR gate 514, inverter 518, flip flop 345 and NOR gate 465 is "#-7". A "start two" command associated with start flip flop 341, NOR gate 520, inverter 522, flip flop 346 and NOR gate 466 is "*-9" and a "stop two" command associated with stop flip flop 342, NOR gate 524, inverter 526, flip flop 347 and NOR gate 467 is "#-9". These systems work essentially as follows.

To issue a "start one" command the user's Touch-Tone key bearing an "*" is depressed, the decoded signal for which is connected along lines 366 and 530 to the input of the start flip flop 341. The high going clock signal causes the output of the start flip flop 341 to go high which partially enables NOR gate 510. The depression of the second digit of the command or digit "7" causes line 362 to go high, which is connected along line 534 and 535 to input pin 12 of NOR gate 510. The low going output of pin 11 of NOR gate 510 is inverted with inverter 512 and connected to input pin 1 of start one flip flop 344, the output of which is connected to input pin 5 of command NOR gate 464. The output of command NOR gate 464, pin 6, is connected along lines 540 and 542 to a start switch 544 and is also capacitor coupled with capacitor 546 along lines 540 and 548 to set a one-shot 550 shown in FIG. 5i, the output of which is connected to a "start one" relay 552 to energize the system component. The system component will then continue to operate until a "stop one" command is given or until the start one one-shot 550 times out.

To stop the system component, the Touch-Tone telephone "#" sign /key is depressed, the signal for which is fed along lines 367 and 556 to input pin 8 of the stop flip flop 342, the output of which is connected to input pin 1 of NOR gate 514 to partially enable the gate. The second digit command or "7" is connected along the lines 362, 534 and 558 to input pin 2 of NOR gate 514, the output of which is connected through inverter 518 to flip flop 345, the "stop one" flip flop. The output of the flip flop 345 is connected from pin 3 along line 560 to pin 1 of the stop one command gate 465, the output of which is connected along lines 562 and 563 to the stop switch 565 for the system component and is capacitor coupled to a stop one one-shot 569 with capacitor 572 along line 574. The output of the one-shot 569 energizes a stop relay 576 to deenergize the system component being controlled. The output of the stop one one-shot 569 is also connected to one-shot 550 to assure that the system component cannot be restarted until the stop one-shot 569 times out.

Similarly the "start two" and "stop two" commands are connected through flip flops 341 and 342, NOR gates 520 and 524, inverters 522 and 526, flip flops 346 and 347, and command gates 466 and 467, to "start two" and "stop two" switches 586 and 583 and relays 582, 587, respectively.

If, rather than starting or stopping system components, the user wishes to monitor operation of system components, provision is also made to allow him to do so. Four monitors are indicated, each of which may be connected to the tone output terminal 190. The commands for the individual monitors are indicated in FIGS. 5a, 5b and 5d to be "1-2", "1-3", "1-4" and "1-5." It should be understood, however, that any number of digital commands could be wired in a similar manner to achieve the same result. An additional command, "1-6", is also provided to "hang-up" the device when the user has completed the control and monitoring functions he desires.

As with the start and stop commands, the signal for the first monitor command digit, digit "1", is connected along lines 356 and 590, to input terminal 1 of the monitor command flip flop 343. The output of flip flop 343 is connected along line 592 to partially enable NOR gate 602. The second monitor command digit, in this case, "2,"is connected along lines 357 and 604 to input pin 9 of NOR gate 602 to fully enable NOR gate 602, the output of which is connected through inverter 606 to the input of monitor command "1-2 flip flop 348, the output of which is connected along line 608 to the input of command gate 468. Since the system status will be monitored whenever any system component is not monitored or when no commands are taking place, the commanded monitors are preferably monitors other than the system status. Accordingly, the output of each of the monitor command gates 468, 469, 470 and 471, is wired along lines 612, 210, 614 and 247, respectively, to the system status inhibit gate 212, the output of which is used to inhibit the system status monitor output gate 185 shown in FIG. 5f discussed above.

When used with an irrigation system, the first command is utilized to monitor an end tower, not monitored in the initial monitoring sequence. The second command is utilized to monitor a water pump which was the second system parameter monitored during the initial monitoring sequence. The third monitor command is utilized for a spare monitor which can be located anywhere the operator desires and the fourth monitor command is utilized to monitor operation of a diesel engine with a microphone or any other system component that the user desires to listen to directly. Tonal sound differentiation for the various parameters being monitored is obtained as follows.

For the first monitor command "1-2," the output of NOR gate 468 is connected by line 612 to inhibit the system status signal. It is also connected with line 620 to energize the end tower monitor switch 622 and is inverted with inverter 623 and connected along lines 624 and 625 to partially enable NOR gate 397. It is also connected along lines 624 and 627 through resistor 630 to turn on transistor 159 to produce a medium tone.

There are three inputs to NOR gate 172, shown in FIG. 5f, one of which is the sensor 178 connected along line 632, inverter 634, line 636 to input pin 5 of the NOR gate 172, the second of which is the output from the tone generator 155 connected along lines 182, 183 and 638 to input pin 4. The third input is the inverted output of the on-off multivibrator 156 connected along lines 642, 643 inverter 644 and lines 646 and 678 to input pin 3. The output of the on-off multivibrator 156 is also connected along line 678 and on FIG. 5d, line 678 to enable NOR gate 680 which is fed through NOR gate 232 and line 236 which is connected, on FIG. 5f, along line 236 and resistor 238 to turn on transistor 158 on every half cycle of the on-off multivibrator 156. Consequently, when the end tower is operating and the sensor 178 enables NOR gate 172 the sound emanating from the end tower status output gate 397 along lines 186 and 165 to the tone output 190 will be an alternating middle and low toned signal alternating at one-half second intervals. When the end tower is off and the sensor 178 disables NOR gate 172, the output will be an intermittent middle tone again at a cycle of one-half second.

The second monitor command, "1-3", enables flip flop 343, NOR gate 690, inverter 692, flip flop 349 and command gate 469 in the manner described above for command "1-2". This monitor is the second monitor that is energized during the automatic monitor sequence described earlier and, thus, when command gate 247 is enabled a continuous low tone will be produced if the monitored parameter, such as the pump, is operating and an intermittent low tone will be produced if it is not operating, cycling at approximately one-half second cycles.

The third monitor is preferably a spare and can be located anywhere the user desires. It is energized by the command "1-4" in the same manner as the previous monitors with flip flop 343, NOR gate 694, inverter 696, flip flop 350 and command gate 470. The output of command gate 470 is connected along line 614 to inhibit the system status signal and is connected through inverter 702 and along line 706 to a spare monitor status output gate 398, shown in FIG. 5e. It is also connected along line 711 to a shown in FIG. 5j which is distinctly different than the other tonal patterns established by previous logic and discussed above. A convenient circuit has been found to be a wailer circuit 713 which sounds like a fire alarm by producing a sinusoidal oscillating sound when the monitor sensor 179 indicates that the parameter being monitored is operating and which produces an intermittent oscillatory sound when the system parameter being monitored is not operating.

As shown in FIGS. 5a, 5b and 5d the fourth monitor command is "1-5" which enables respectively flip flop 343, NOR gate 716, inverter 717 flip flop 351 and NOR gate 471 in the manner described above. The output signal from NOR gate 471 energizes the reed relay 252 which allows the caller/listener to listen to the microphone as described in detail during discussion of the monitoring sequence above.

Finally, after the user has obtained all the information he desires and has taken whatever actions he wished to take to control the system status he may hang-up the device by touching the command "1-6". In the same manner as prior commands the sequential depression of the digits "1" and "6" sequentially enables flip flop 343, NOR gate 730, inverter 732, flip flop 352 and command gate 472. The output of command gate 472 is connected along line 740, and as shown on FIG. 5h and is connected to the hang-up one-shot 275. When the hang-up one-shot 275 fires it removes the ground from the answering transistor 82. When that occurs there is no ground for the line seize relay 88 and the relay switch drops out and the circuit is off.

Two alternative methods are provided to assure that the telephone is hung-up. As indicated previously, the telephone answering one-shot 110 is also capacitor connected by capacitors 266, 268 and line 272 to the hang-up one-shot 275. Therefore, when the telephone answering oneshot 110 times out the device will also be hung-up in the manner described above. Finally, on the control panel shown in FIG. 2 there is a hang-up button 55 connected to terminal 782 on FIG. 5h which, when depressed, also fires the hang-up one-shot 275 to remove the ground from the answering transistor 82.

In summary, it should be particularly noted that the operating principles from the user's point of view are very simple. The device very clearly reduces time and energy required for management of systems such as a center pivot irrigation system.

The device is connected to an ordinary telephone line. It can be called and will answer the telephone. When the device is called, it will answer the telephone and will cycle through three monitoring functions:

First monitor (nine seconds)
Second monitor (nine seconds)
Microphone (time variable by control panel setting).

The caller may then hang-up or proceed to give commands. However, no commands will be accepted until a three-digit access code, unique to each device, is given. Thus, the security of the remote operation of any user's system is as strong as his control of the dissemination of his access code.

After the access code is entered and accepted it will be confirmed by a staccato burst confirming a valid code. Thereafter, the system will automatically give the caller the status of the system monitored by monitor one.

The operator may then enter any quantity of the following command codes, one at a time:

"1-2" (gives status of system component monitored by Monitor two)
"1-3" (gives status of system component monitored by Monitor three)
"1-4" (gives status of system component monitored by Monitor four)
"1-5" (gives status of system component monitored by Microphone).

Control functions are also available to the user. These commands are used for starting and stopping system components and are obtained by the following commands:

"*-7" Start one
"#-7" Stop one
"*-9" Start two
"#-9" Stop two.

After the user has given all the commands he desires and has determined that the system is operating properly, he may then command the device to hang-up with the command "1-6". If the hang-up command is not given, the device itself will "time-out" and hang-up by itself. The length of time between the telephone answer and the automatic hang-up may also be adjusted by a control on the control panel shown in FIg. 2.

From a consideration of the foregoing disclosure it should be obvious that the invention is a simply constructed, simply operable and economically manufactured mechanism which is not susceptible to the time-consuming complexities of the prior art. It should be understood that modifications and variations may be resorted to without departing from the spirit of the invention as those skilled in the art will readily understand. Such modifications and variations are considered to be within the purview and scope of the present invention as defined by the following claims.

Having described our invention, we claim:

1. A remote monitoring device connectable to a telephone line to be used with a system having a plurality of system components which can be called by a telephone caller on any telephone and controlled by frequency signals transmitted by the telephone caller over the telephone line, comprising:
   sensing means connected to the telephone line for sensing a ringing signal transmitted over the telephone line;
   line seize means for connecting the device to the telephone line after a ringing signal has been sensed by the sensing means;
   receiving means for receiving the frequency signals transmitted by the telephone caller oer the telephone line;
   decoding means connected to the receiving means for decoding the frequency signals transmitted over the telephone line;
   a plurality of sensors, each sensor associated with a system component, the operating status of which is to be monitored;
   audible sound producing means for producing tonal patterns to indicate which system component is being monitored and the operating status of the system component, comprising;
      an audible tone producing device for producing a plurality of audible single frequency tones to be transmitted to the telephone caller; and
      a tone varying device connected to the sensors for causing a variation in the tones produced by the tone producing device depending on the operating status of the system component being monitored by the selected sensor;
   programmable logic means for selectively monitoring the operating status of selected system components according to predetermined frequency signals transmitted over the telephone line by the telephone caller, comprising;
      gating means connected to and controlled by the decoding means and connected to the sensors and the sound producing means so that different audible single frequency tones are produced by the tone producing device for each sensor and the tonal pattern is controlled by the tone varying device depending on the operating status of the system component being monitored by the selected sensor; and
   transmitting means for transmitting the audible tones produced by the sound producing means to the telephone line whereby the operating status of each selected system parameter being monitored is transmitted to the listener.

2. The device of claim 1 for use with a dual tone multiple frequency telephone of the type which transmits over the telephone line a plurality of distinct dual tone frequencies and wherein the decoding means comprise means for decoding dual tone multiple frequency signals received by the receiving means and wherein the programmable logic means selectively monitors the operating status of the selected system component after a predetermined sequence of dual tone multiple frequency signals have been received by the receiving means.

3. The device of claim 1 wherein the sound producing means produces a high pitched tone.

4. The device of claim 1 wherein the sound producing means produces a medium pitched tone.

5. The device of claim 1 wherein the sound producing means produces a low pitched tone.

6. The device of claim 1 wherein the sound producing means produces an intermittent tone.

7. The sound producing means of claim 1 wherein the sound producing means produces an oscillatory tone.

8. The device of claim 1 wherein the sound producing means produces a tone having a pitch which alternates at a predetermined repetition rate.

9. The device of claim 1 wherein the tone is varied for each mode of operation of the system component which is being monitored.

10. The device of claim 1 for use with a system having an actual sound of operation wherein one of the sensors comprises a microphone connected to the transmitting means whereby the actual sound of operation of the system can be transmitted to the telephone caller by the transmitting means.

11. The device of claim 1 wherein the sound producing means will produce a high pitched continuous tone if the system component being monitored is operating and a high pitched intermittent tone if the system component being monitored is not operating.

12. The device of claim 1 wherein the sound producing means will produce a low continuous tone if the system component being monitored is operating and an intermittent low pitched tone if the system component is not operating.

13. The device of claim 1 wherein the sound producing means will produce an alternating medium and low pitched tone if the system component is operating and an intermittent medium pitched tone if the system component is not operating.

14. The device of claim 1 further comprising second sound producing means for producing an oscillating wailing tone if a selected system component is operating and an intermittent oscillating tone if the system is not operating.

15. The device of claim 1 further comprising second logic means connected to the sensors for automatically monitoring the system status and the operating status of system components in a preselected sequence, comprising timing means for establishing sequential time intervals whereby a different system component can be monitored during each time interval, and wherein the gating means are connected to and controlled by the timing means and connected to the sensors and the sound producing means whereby the tonal patterns indicating the operating status of each system parameter being monitored are automatically and sequentially transmitted to the telephone caller during the intervals of time established by the timing means.

16. The device of claim 1 wherein each predetermined frequency signal comprises two sequential signals, each having a different frequency.

17. The device of claim 15 wherein the system is an irrigation system having as system components a pump, an end tower and a diesel engine and at least one other irrigation system component and wherein the sensor means comprises means for monitoring the operating status of the irrigation system and of the pump, the end tower, the diesel engine and the other system component and wherein the second logic means automatically and sequentially monitors the operating status of the irrigation system, the operating status of the pump and the operating status of the diesel engine and wherein the operating status of the pump, the end tower, the diesel engine, and the other system component can be monitored with the logic means with predetermined frequency signals received by the receiving means.

18. The device of claim 1 wherein the system also has system controls and wherein the logic means are also connected to at least one system control for selectively controlling at least one system component.

19. The device of claim 18 wherein the logic means is connected to a system control for starting at least one system component.

20. The device of claim 18 wherein the logic means is connected to a system control for selectively stopping at least one system component.

21. The device of claim 18 wherein the logic means comprises means for selectively starting and stopping at least one system component.

22. The device of claim 18 wherein the logic means selectively control at least one system component according to a predetermined sequence of frequency signals.

23. The device of claim 18 wherein the logic means comprises means for selectively controlling the system component after a predetermined sequence of frequency signals have been received over the telephone line by the receiving means.

24. The device of claim 23 wherein the predetermined sequence of signals comprises two sequential signals, each having a different frequency.

25. The device of claim 1 further comprising access means connected to the decoding means and to the logic means for limiting access to the logic means.

26. The device of claim 25 wherein the access means comprises a plurality of electronic components each of which must be enabled by a predetermined sequence of frequency signals received by the receiving means.

27. The device of claim 26 further comprising inhibiting means connected to the access means and to the logic means for inhibiting the operation of the logic means until the plurality of electronic components have been enabled by the predetermined sequence of frequency signals.

28. The device of claim 26 wherein the preselected sequency of signals comprises three sequential signals each having a different frequency.

29. The device of claim 26 further comprising second sound producing means connected to the access means and to the transmitting means whereby a frequency beat signal between the sound producing means and the second sound producing means will be transmitted by the transmitting means as an indication that the electronic components have been enabled.

* * * * *